June 3, 1947.    H. J. BURKE    2,421,372
DUPLEX PRESSURE PROPORTIONER
Filed Nov. 12, 1943    5 Sheets-Sheet 3
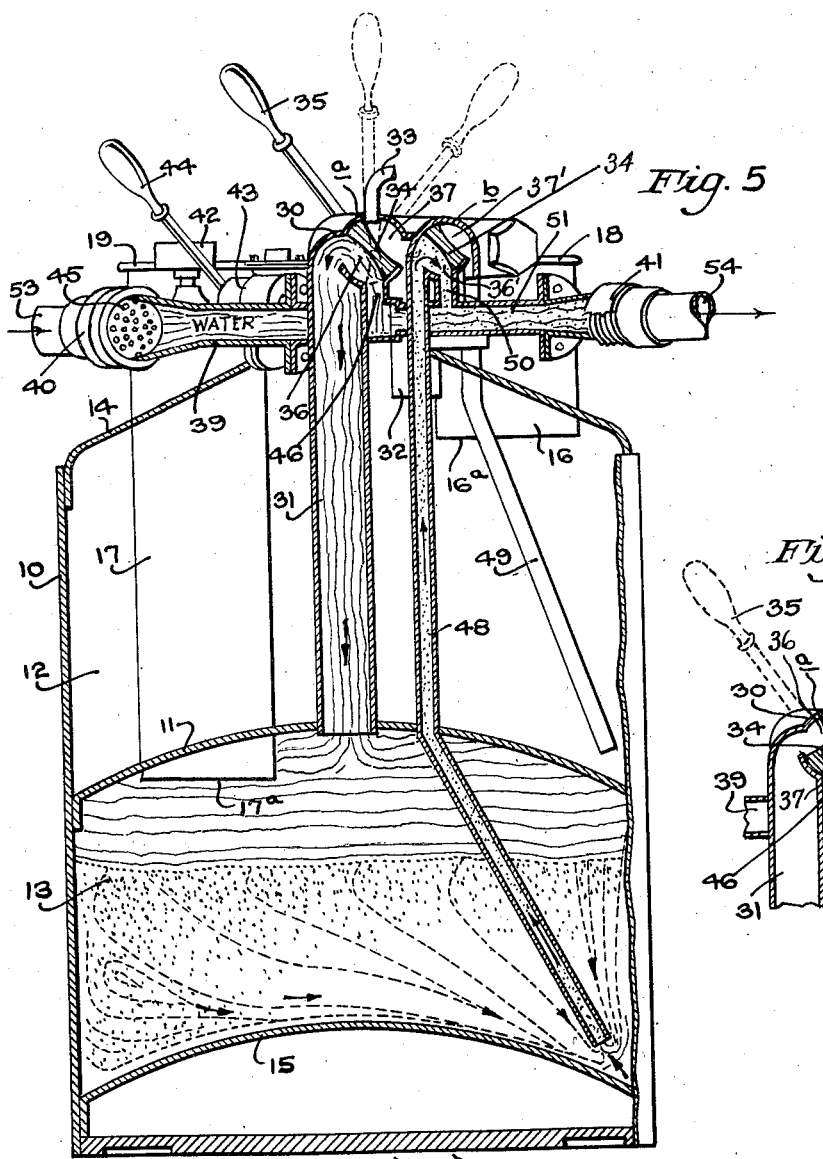
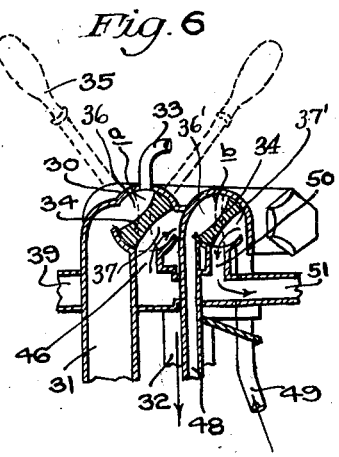
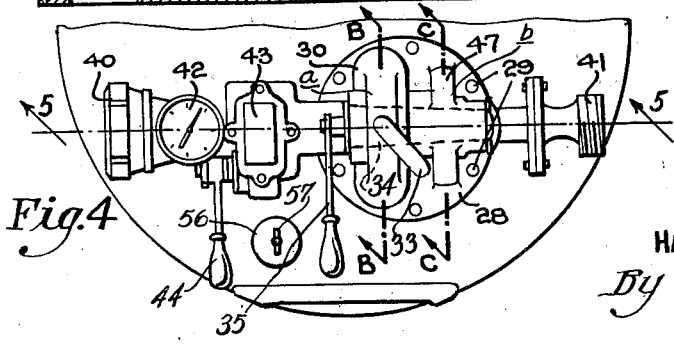
Inventor
HAROLD J. BURKE
By
Attorney June 3, 1947.  H. J. BURKE  2,421,372
DUPLEX PRESSURE PROPORTIONER
Filed Nov. 12, 1943  5 Sheets-Sheet 5

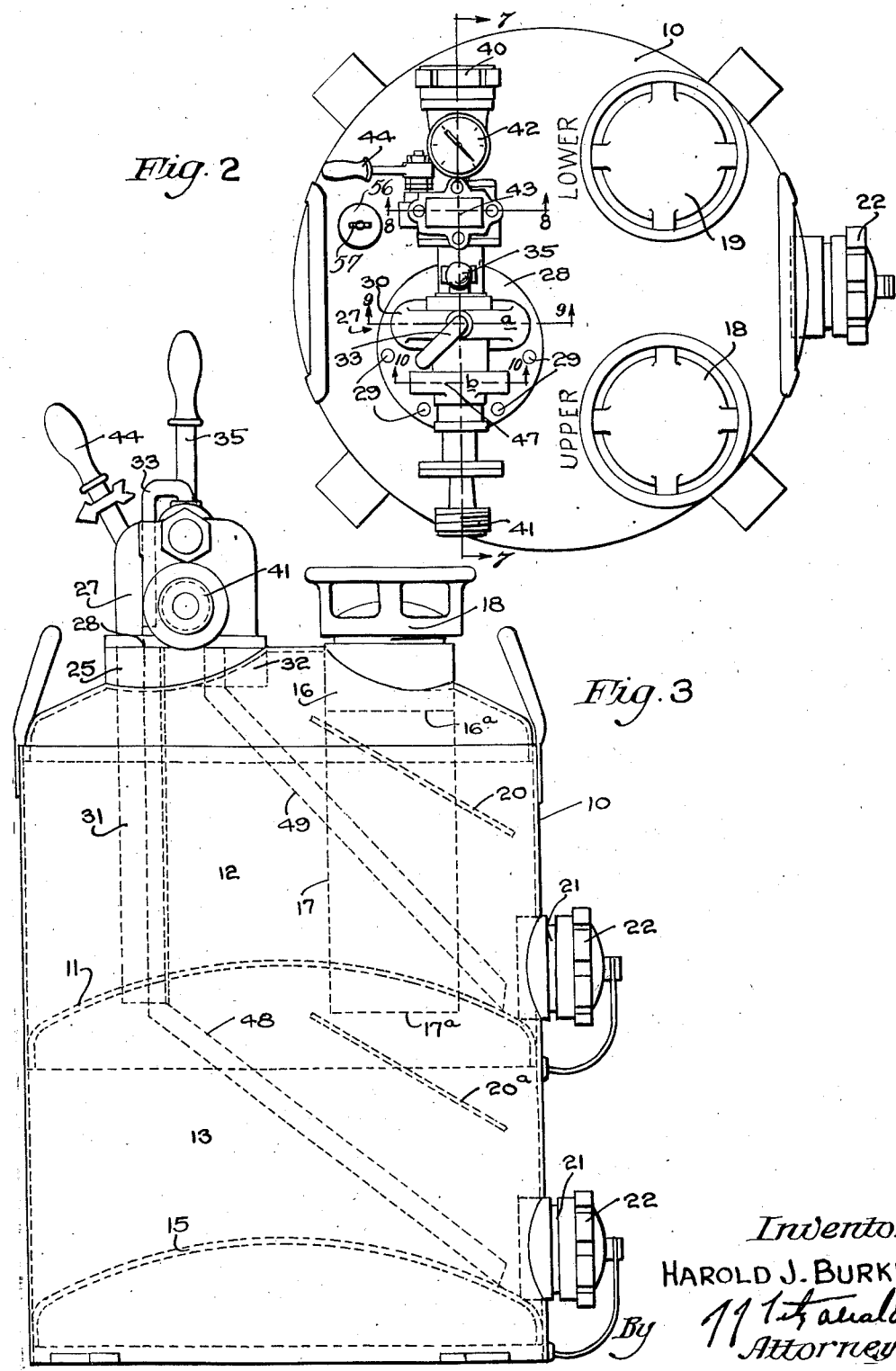

Inventor
HAROLD J. BURKE
By Ralph L. Chappell
Attorney

Patented June 3, 1947

2,421,372

UNITED STATES PATENT OFFICE 2,421,372

DUPLEX PRESSURE PROPORTIONER

Harold J. Burke, United States Navy

Application November 12, 1943, Serial No. 510,041

11 Claims. (Cl. 169—14)

(Granted under the act of March 3, 1883, as amended April 30, 1928; 370 O. G. 757)

This invention relates generally to apparatus for use in the generation of mechanical or air foam employed in the extinguishment of fires and more particularly to an improved construction of apparatus for introducing a foam stabilizing solution into a stream of water.

In the production of the so-called mechanical or air foam, the usual procedure involves flowing a high velocity stream of water laden with a foam-forming substance through a conduit to a point therein where the stream is finely subdivided or dispersed and where a suitable gas (usually air from atmosphere) is entrained in such manner as to cause a mingling of the liquid and gas as they move in the conduit toward the point of discharge therefrom. Typical of this method of producing mechanical foam is that which is described in United States Letters Patent No. 2,106,043, granted January 18, 1938, and No. 2,198,585, granted April 23, 1940.

In order to insure the production of foam of the desired uniform quality, it is necessary that the rate of introduction of the foam-forming material into the flowing stream of water be proportional to the rate of flow of the water, while in order to insure an adequate projection of the foam from the discharge nozzle it is necessary to maintain a considerable head of pressure upon the water stream.

Apparatus for securing these objectives by maintaining a large head of pressure in the water stream to provide adequate projection of the stabilized foam and utilizing the available head of pressure to force the stabilizer material from its source of supply and inject it into the water stream at a rate which is automatically proportioned to the rate of flow of the water stream without mixing the stabilizing material and water at the source of supply is well known in the art.

The principal object of the present invention is to provide an apparatus of the character described with means whereby it may be operated continuously and uninterruptedly over an extended period, as may be required in the extinguishment of an extensive fire requiring a large quantity of foam-forming material. For this purpose the present invention provides in an apparatus of the character hereinbefore described at least two sources or reservoirs of foam-forming material which may be employed alternately to supply foam-forming material to the flowing stream of water, the apparatus including suitable means for facilitating shifting from one to another source of supply of foam-forming material practically instantaneously and without interrupting the continuous flow of fire extinguishing foam.

In addition, the present apparatus permits the ready replenishment of the exhausted reservoir while the other reservoir is in operation, thereby making it available for immediate use upon the exhaustion of the other reservoir and so insuring a substantially constant source of supply of the foam-forming solution.

Another important object of this invention is to provide a suitable timer and signal mechanism for warning an operator when a shift from one reservoir to the other should be carried out.

Still other objects and advantages of the present invention, such as the provision of a unit which is exceedingly compact and simple in construction, which is readily portable and easily operable without requiring the constant attendance of an operator and which is extremely efficient in use, will appear more full hereinafter from a reading of the following description and appended claims in conjunction with the attached drawings wherein:

Figure 2 is a top plan view of the same;

Figure 3 is a side elevational view of the same;

Figure 4 is a partial top plan view of the apparatus showing particularly the valve devices employed;

Figure 5 is a combined sectional view, which for the purpose of fully illustrating the construction and operation of the apparatus, is taken on line 5—5 of Figure 4 viewed as indicated by the arrows associated with line 5—5, the valve for controlling the pressure head on one or the other of the reservoirs for the foam-forming material and for controlling the flow of foam-forming material alternately from one or the other of the reservoirs being shown as taken on lines B—B and C—C of Figure 4 viewed as indicated by the arrows, the valve as shown in Figure 5 being set to provide a pressure head on the lower reservoir and to permit the flow of foam-forming material from said lower reservoir;

Figure 6 is a detail sectional view showing the valve positioned to utilize the upper reservoir.

Figure 1:
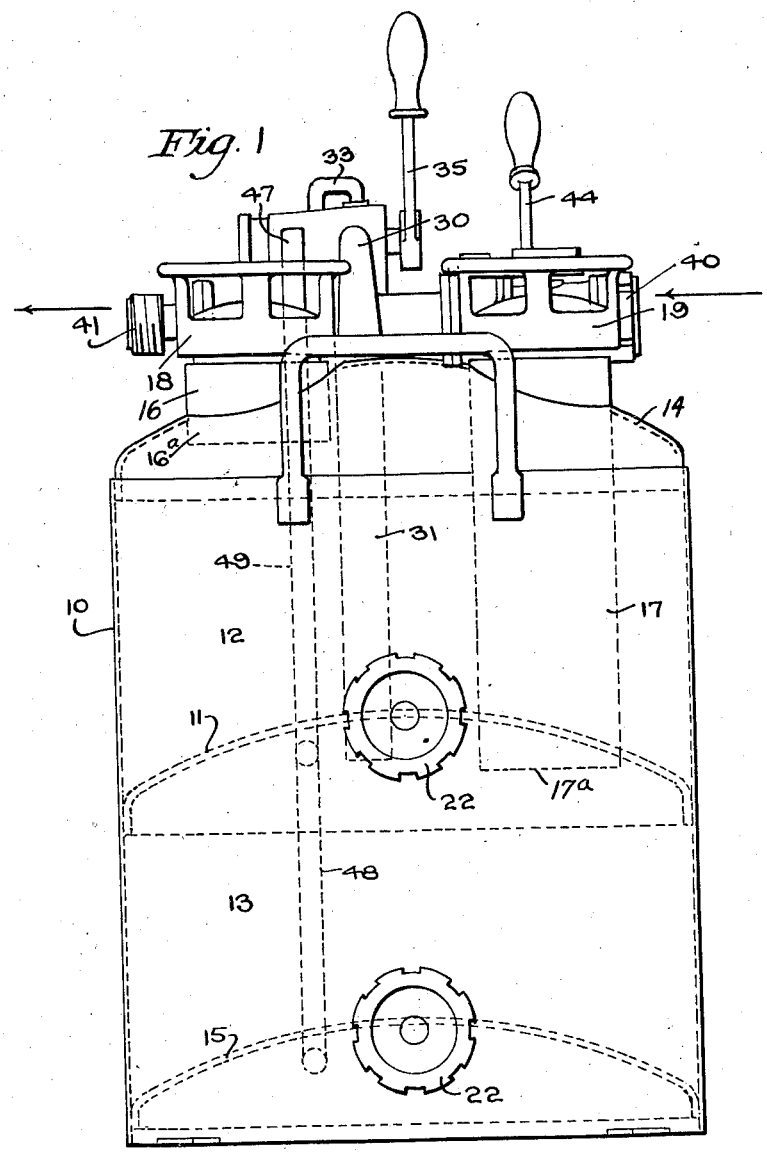
Figure 1 is a front elevational view of an apparatus constructed in accordance with and embodying the principles of the present invention.
Figure 7:
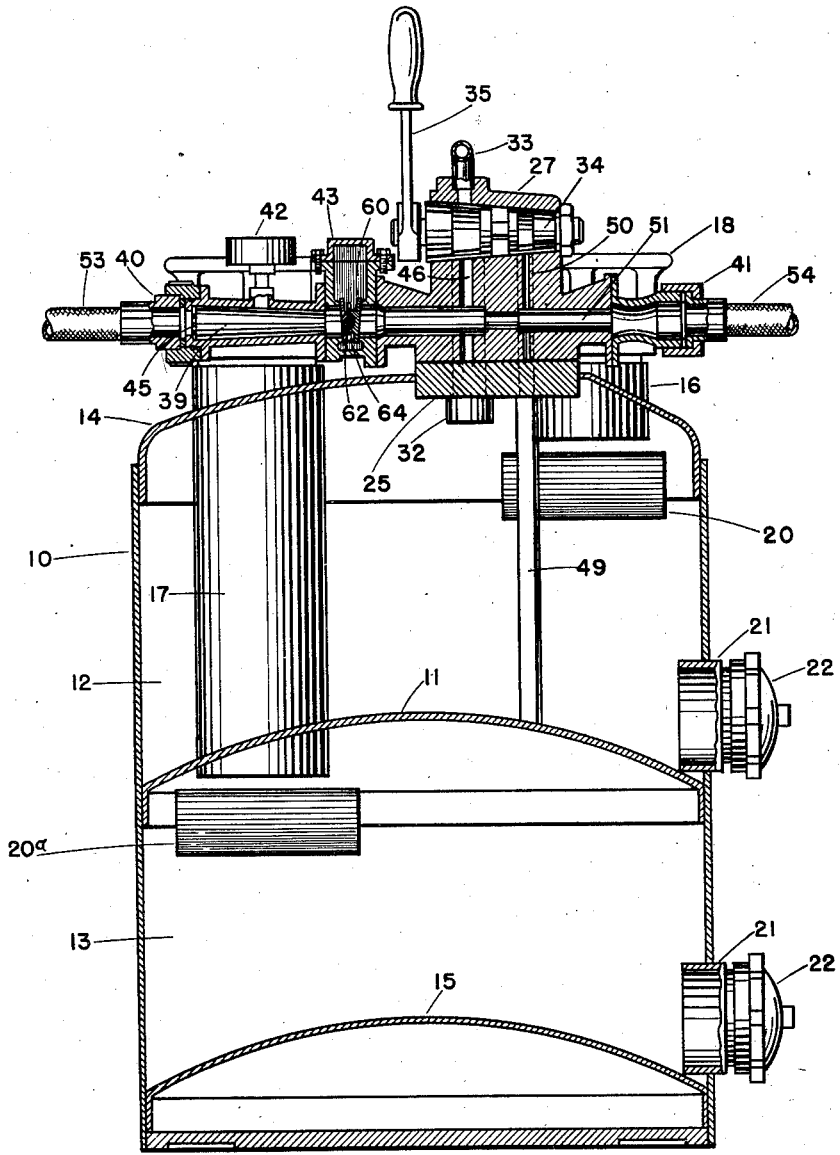

Figure 7 is a longitudinal vertical section, partly in elevation, taken along section line 7—7 of Figure 2 viewed in the direction indicated by the arrows.

Figure 8:
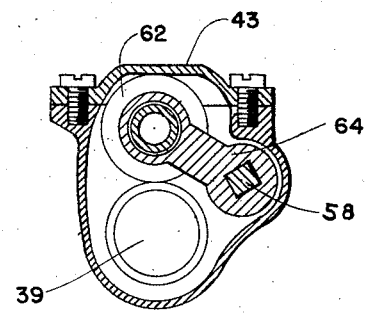

Figure 8 is a transverse, vertical section through the water feed valve, partly in section and partly in elevation, taken along section line 8—8 of Figure 2 viewed in the direction indicated by the arrows.

Figure 9:
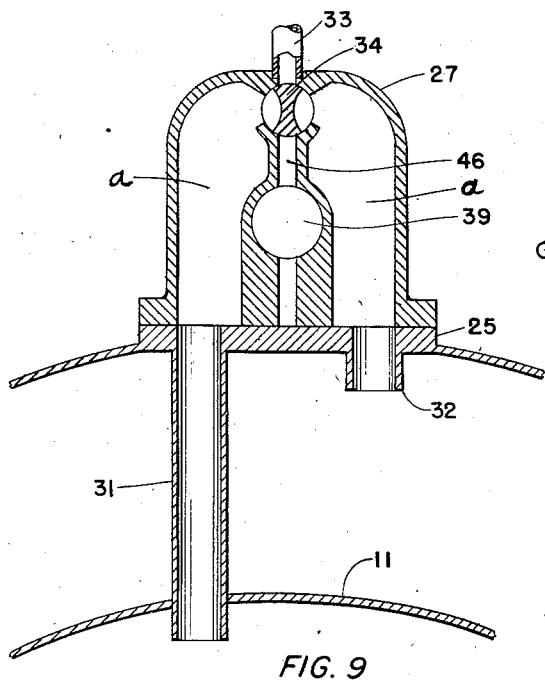

Figure 9 is a transverse vertical section through the inlet valve, partly in elevation and partly in section, taken along section line 9—9 in Figure 2 viewed in the direction indicated by the arrows.

Figure 10:
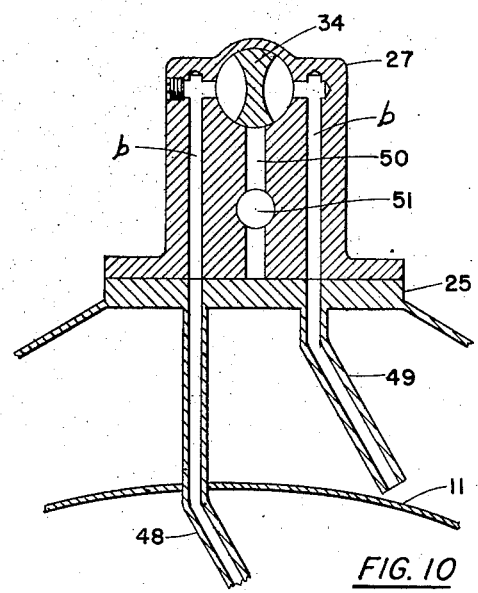
Figure 11:
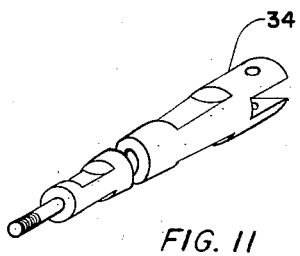

Figure 10 is a transverse section through the discharge valve, taken along section line 10—10 in Figure 2 partly in section and partly in elevation, viewed in the direction indicated by the arrows; and Figure 11 is an isometrical projection of the oscillating valve plug which is common to both the inlet and discharge valves.

The main object of the present invention, as heretofore indicated, is to provide two reservoirs of foam-forming material from which such material may be alternately drawn for continuously supplying the same to a stream of water or other fire extinguishing material, the exhausted reservoir being adapted to be replenished with the foam-forming material without interfering with the continuous flow of fire extinguishing material. In the present and preferred embodiment of the invention the two reservoirs are disposed in a single container 10 which is provided with a partition 11, thus forming the two chambers 12 and 13. As shown, the two chambers are disposed in vertically spaced relation, one immediately above the other, but it will be understood that the chambers may be otherwise disposed without departing from the general principles of the present invention.

The partition 11 is dished and flanged so as to withstand the high pressures employed, and for the same reason the chamber 12 is provided with a dished top 14, and the chamber 13 is provided with a dished bottom 15.

The container 10 is provided with a pair of filling conduits 16 and 17 for filling the chambers 12 and 13, respectively, with foam-forming liquid; the conduit 17 extending through the chamber 12 and partition 11 to present its lower open extremity 17a in communication with the upper region of the chamber 13, while the conduit 16 extends through the top 14 of the container to present its lower open end 16a in communication with the upper region of the chamber 12. The filler pipes 16 and 17 are provided, respectively, with closure caps 18 and 19; and the chambers 12 and 13 are preferably provided with baffle plates 20 and 20a immediately below the lower ends of filling tubes 16 and 17 (see Figure 3) to prevent the foam-forming material from backing out of the filler openings upon foaming and sudden expansion of the foam-forming material incident to filling the chambers. Each of the chambers 12 and 13 is provided with a drain 21 and closure 22.

The top 14 of the container 10 is provided with a collar 25 having an opening therethrough, the collar being adapted to removably support a unitary assembly comprising a water conduit and valves indicated generally by reference character 27. Preferably, this unitary assembly 27 is provided with a base plate or flange 28 which is secured to the collar 25 by screws or bolts 29.

The specific construction of assembly 27 may take any suitable form so long as means is provided for alternately by-passing a portion of the water flowing through the water conduit into reservoirs 12 and 13 and for alternately delivering foam-forming solution from reservoirs 12 and 13 respectively into the water conduit beyond the by-pass connection. A suitable assembly for accomplishing this purpose is illustrated in the drawings and comprises a main valve body 30 having spaced arcuately shaped inlet and outlet passages $a$ and $b$. Passage $a$ comprises a U-shaped passage, the opposite ends of which are respectively in communication with a tube 31 leading to the chamber 13 and with a tube 32 leading to the chamber 12. A vent 33 open to atmosphere is provided at the top of the valve body 30 substantially midway between the opposite ends thereof.

An oscillating valve plug 34, operable by a handle 35, is disposed interiorly of the valve body 30 and is provided with a pair of inlet passages 36 and 37, as shown in Figure 5, for the purpose of diverting water under pressure delivered through the water conduit 39 to either of the chambers 12 or 13, as desired.

The water conduit 39 is provided with an inlet 40 and an outlet 41, the latter leading to an air aspirator and nozzle (not shown). A pressure gauge 42 is connected into the water conduit 39, and a main water valve 43, operable by handle 44, with its associated shaft 58, arm 64 and valve slides 60 and 62 is included in the conduit 39 to control the supply of the water flowing through the conduit. If desired, and preferably so, a strainer 45 is disposed in the conduit at the inlet end thereof. The conduit 39 communicates with one or the other of the passages 36 and 37 in valve plug 34, depending upon the position of the valve plug 34, by way of a passage 46.

From the foregoing, it will be understood that as the water under pressure flows through conduit 39, a portion of it will be directed into the chamber 13 by way of the passage 46, passage 36 and tube 31 when the valve plug 34 is in the position shown in Figure 5. On the other hand, when the valve plug 34 is in its opposite position, as shown in Figure 6, a portion of the water under pressure supplied by the conduit 39 will be directed into the chamber 12 by way of the passage 46, the passage 37 and the tube 32. The valve plug 34 may also occupy an intermediate closing position in which it closes the upper end of the passage 46, thereby preventing the flow of water from the conduit 39 to either of the chambers 12 and 13. This closed position of the valve is indicated in Figure 6 by the intermediate dotted line position of the valve plug 34.

A substantially identical construction, but on a somewhat smaller scale, is employed for injecting the foam-forming liquid alternately from chambers 12 or 13 into the low pressure side of the water conduit 39 through passage $b$. Passage $b$ comprises a U-shaped passage, the opposite ends of which are in communication, respectively, with the foam solution delivery tubes 48 and 49. The tube 48 extends to a point adjacent the bottom of the compartment 13, while the tube 49 extends to a point adjacent the bottom of the chamber 12. As most clearly appears in Figures 5 and 6, passage $b$ is in communication, by way of the passage 50, with a continuation 51 of the conduit 39, this continuation of the main water delivery conduit being of such construction as to provide a Venturi passage through which the water is projected under suitable pressure. The passage 50 leading from the passage $b$ thus communicates with the low pressure section of the Venturi passage.

Valve plug 34 at passage $b$ is provided with a pair of outlet passages 36′ and 37′ for controlling the flow of the foam-forming solution into the water stream passing through conduit 39. Thus, when the valve plug 34 is positioned as shown in Figure 5, the foam-forming solution is delivered from the chamber 13 into the water stream passing through the low pressure section of the Venturi passage by way of the delivery tube 48, while when the valve plug is positioned as shown in Figure 6, the foam-forming solution is delivered into said stream from the chamber 12 by way of the delivery tube 49. In its intermediate position, as represented by the dotted line showing in Figure 6, the valve plug 34 closes the passage 50 and so prevents delivery of foaming solution from either of the chambers 12 and 13.

Since a single valve plug 34 having axially spaced ports 36, 37 and 36', 37' is provided, simultaneous control of inlet and outlet passages $a$ and $b$ is effected by the single operating handle 35. It is to be understood, however, that separate valves, arranged in passages $a$ and $b$ respectively to secure the paths of flow indicated in Figures 5 and 6, and suitably connected to assure simultaneous operation, may be substituted for plug valve 34 without departing from the spirit of this invention.

The water inlet end 40 of the passage 39 is connected by means of a suitable coupling and hose 53 to a hydrant or other source of water under suitably high pressure. The outlet or discharge end 41 of the passage 39 is connected to a discharge conduit 54 through which the water mixed with the foam stabilizer solution is delivered to the point where air is entrained and thence discharged in the form of fire extinguishing foam. Any suitable manner and means for effecting the entrainment of air or other gas into the stream of water laden with the foam forming substance may be employed. It will be understood in this connection that this invention is not limited to the use of any particular type of foam-forming material. Usually this material is in the form of an aqueous solution of a secondary extract of licorice, of saponin or of other suitable substance having the capacity of being foamed when a gaseous medium is injected into a solution or suspension thereof.

The chambers 12 and 13 are normally filled with foam stabilizing solution and the valve handle 35 is in the intermediate position to close off the passages 46 and 50. When it is desired to place the apparatus in operation, the valve handle 35 is moved to either extreme position, and at the same time the water valve 43 is opened to the desired extent. The water then passes through the conduit 39 and the Venturi passage 51 and thence through the discharge conduit 54. Assuming that the handle 35 is in the full line position shown in Figure 5, it will be noted that as the water passes through the valve 34, a portion of it flows under considerable pressure upwardly through the passage 46, the passage 36 of the valve 34 and thence downwardly through the tube 31 and into the top of the chamber 13, where it exerts a considerable pressure on the solution in the chamber. Due to the fact that the tube 48 is in communication with the low pressure portion of the Venturi passage by way of the passage 50 and passage 36' of valve 34, there exists a pressure differential between the latter point and the point of approach of the water pressure upon the upper surface of the foam solution, which results in a flow of the foam solution upwardly through the tube 48 by way of said passages 50 and 36' into the flowing stream of water. This flow of foam stabilizing solution from the chamber 13 into the stream of water will continue so long as a stream of water under suitable pressure flows through passage 39 and until the supply of foam solution in that chamber is exhausted. Inasmuch as the flow of the foam solution upwardly through the tube 48 is dependent upon the pressure differential existing between the high and low pressure portions of the passage 39, it will be apparent that by the proper design of the cross sectional areas of the several portions of the passage 39, and particularly of the passages 46 and 50, the ratio of the rate of flow of the foam solution to the rate of flow of the water stream may be predetermined and maintained.

By reason of the comparatively large cross section of conduits 31 and 32, the rate of flow of water from passage 46 is reduced and the water passes downwardly into chamber 12 or 13 in a quiet non-agitating manner, thereby avoiding stirring up the foam stabilizing material in the chamber.

When the foam stabilizer solution is exhausted from the chamber 13, the latter becomes filled with water under pressure. The handle 35 is then moved to its opposite extreme position, thereby establishing communication between the water stream in conduit 39 and the second chamber 12 so as to continue the supply of foam-forming material from the chamber 12 into the stream of water. In this case, of course, the foaming solution is delivered into the flowing stream of water by way of the delivery tube 49, passage 37' and the passage 50 which is in communication with the low pressure section of the Venturi passage 51.

It will be noted that when one of the chambers, e. g., chamber 13, is exhausted of its supply of foam-forming material, and the handle 35 is thrown into position to effect delivery of such material from the second chamber 12 (see Figure 6), the valve 34 then assumes a position to establish free communication between the interior of the chamber 13 and atmosphere by way of the vent 33. Conversely, when the chamber 12 is exhausted of its supply of foaming solution and the handle 35 is thrown into the position shown in Figure 5, the interior of the chamber 12 is freely vented to atmosphere. By so venting each of the chambers 12 and 13 to atmosphere as they are exhausted of their respective supplies of foam-forming material, the internal pressure developed in a given chamber is relieved automatically as the other chamber is placed in operation. Consequently, as a given chamber is exhausted of its supply of foam-forming material and relieved of internal pressure, its drain may be opened to release the clear water accumulated therein, following which the drain opening is again closed and the said chamber refilled with a further supply of foam-forming solution by way of the filling tube, the tube 16 for chamber 12 or the tube 17 for chamber 13. When the filling tube cap of a given chamber is replaced, said chamber is ready for immediate use.

It will be apparent that by means of the present invention, a continuous supply of foam-forming liquid may be introduced into a flowing stream of water to produce fire extinguishing foam, the chambers 12 and 13 being alternately filled and emptied of the foam-forming liquid as hereinbefore described to insure an uninterrupted production of such foam for as long a period as may be necessary to extinguish a fire.

To assure proper operation of handle 35 when one or the other of reservoirs 12 and 13 is exhausted a suitable timing mechanism 56 (Figures 2 and 4) adapted to sound an alarm after a predetermined time is mounted on top 14 adjacent handle 35. While timing mechanism 56 may take any suitable form, a simple spring wound timer having a winding key 57 adapted to be wound each time handle 35 is operated has been found to be satisfactory. Such devices are well known and many different forms, such as the timer sold by N. A. Rhodes, Inc., under the trade name "Mark Time," may be obtained on the open market.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention described herein may be manufactured and used by or for the Government of the United States of America for governmental purposes without the payment of any royalties thereon or therefor.

What is claimed as new and useful is:

1. In an apparatus for injecting a solution of foam-forming material into a flowing stream of water, a pair of reservoirs for foam-forming solution, a device comprising an inlet and outlet valve body provided with a unitary, oscillating valve plug adapted to be operable as to the inlet and outlet of the valve body, interposed in a conduit for delivering water under pressure from a source of supply to a point of discharge, high pressure conduits connecting said device to an upper portion of each said reservoir, low pressure conduits connecting said device to a lower portion of each said reservoir, and means for selectively closing the conduits connecting said device to either reservoir.

2. An apparatus of the character defined in claim 1, wherein each reservoir has filling means and drain means whereby either reservoir may be drained and refilled while the other reservoir is in operation.

3. An apparatus of the character defined in claim 1, wherein each reservoir has filling means and drain means whereby either reservoir may be drained and refilled while the other reservoir is in operation, and wherein the device has an air vent constantly in communication with the reservoir which is out of use.

4. In an apparatus for injecting foam-forming material into a flowing stream of water, a pair of reservoirs for foam-forming material, means forming a water conduit, means providing passages connecting said water conduit and the top of each reservoir, means providing other passages connecting the bottom portion of each reservoir and said conduit, and valve means comprising a unitary, oscillating valve plug interposed in said passages for selectively establishing such communications to render only one of said reservoirs operative at any one time as a source of supply of said foam-forming material.

5. Apparatus for continuously injecting a solution of foam forming material into a flowing stream of water, comprising at least a pair of reservoirs for receiving foam-forming solution; a conduit for delivering a stream of water under pressure from a source of supply to a point of discharge; common means for connecting said reservoirs to said conduit and delivering foam-forming material alternately from said reservoirs to said conduit; and means for independently filling said reservoirs with foam-forming solution whereby an exhausted reservoir may be filled while another is delivering foam-forming solution to said conduit.

6. The combination defined in claim 5, wherein said common means is designed and arranged to deliver foam-forming material to said conduit at a rate proportioned to the rate of flow of said stream.

7. In a fluid mixing device having a plurality of sources of foam-forming material and a flowing stream of water under pressure, the method of continuously producing an aqueous solution of foam-forming material for use in the production of fire extinguishing foam, comprising selectively by-passing a portion of said stream to one of said sources of foam-forming solution and simultaneously discharging said solution into said stream under influence of the pressure of said by-passed portion of said stream until said source is substantially exhausted; then by-passing said portion of said stream to another of said sources of foam-forming solution and simultaneously discharging solution from said last-mentioned source into said stream under influence of the pressure of said by-passed portion of said stream until said last-mentioned source is substantially exhausted while replenishing said first mentioned source of solution, by-passing to a particular source of foam-forming solution being accomplished by the rotation of a unitary oscillating valve plug to the proper position in its valve body, and continuing these steps as long as continuous production of said aqueous solution is desired.

8. An apparatus for injecting foam-forming material into a flowing stream of water, comprising a conduit for conveying a stream of water under pressure from a source of supply to a point of discharge and having an inlet section and a Venturi section, at least two reservoirs adapted to contain foam-forming material, first independent conduit means connecting said inlet section to the top portion of each of said reservoirs, second independent conduit means connecting the bottom portion of each of said reservoirs to said Venturi section, and means for simultaneously closing both of the conduit means extending from either reservoir to said inlet and Venturi sections.

9. Apparatus for receiving foam-forming material and injecting it into a flowing stream of water under pressure, comprising a tank having a pair of independent, superposed storage chambers for receiving foam-forming material and a top closure; means carried by said top closure at one side thereof for conveying a stream of water across said top closure, means for alternately diverting a portion of said stream into said chambers and injecting foam-forming material into said stream beyond the point of diversion from the chamber into which said stream is diverted; a pair of filler conduits at the other side of said top closure, one of which discharges into the upper chamber and the other of which passes through said upper chamber and discharges into said lower chamber; and closure means for independently closing said filler conduits.

10. The combination defined in claim 9, wherein said chambers have upwardly dished bottom walls forming annular troughs adjacent their juncture with the side walls and said injecting means comprises separate foam-forming material discharge conduits, the entrance ends of which are respectively disposed in the troughs of said upper and lower chambers.

11. In an apparatus for injecting foam-forming material into a flowing stream of water, a pair of reservoirs for foam-forming material, means forming a water conduit, means providing relatively large passages connecting said water conduit and the top of each reservoir, means providing other relatively restricted passages connecting the bottom of each reservoir and said conduit, and valve means comprising a unitary, oscillating valve plug for selectively closing the passages connecting said conduit to either said reservoir.

HAROLD J. BURKE.

REFERENCES CITED

The following references are of record in the file of this patent:

UNITED STATES PATENTS

| Number | Name | Date |
| --- | --- | --- |
| 1,085,348 | Ledoux | Jan. 27, 1914 |
| 2,188,066 | Timpson | Jan. 23, 1940 |
| 1,150,673 | Greth et al. | Aug. 17, 1915 |
| 2,327,335 | Boerner et al. | Aug. 24, 1943 |
| 1,547,545 | Wood | July 28, 1925 |